United States Patent [19]
Faigle et al.

[11] Patent Number: 5,335,936
[45] Date of Patent: Aug. 9, 1994

[54] SEPARABLE CONNECTION FOR AN AIR BAG COVER ASSEMBLY

[75] Inventors: Ernst M. Faigle, Dryden; Joseph F. Ziomek, W. Bloomfield, both of Mich.

[73] Assignee: TRW Vehicle Safety Systems Inc., Lyndhurst, Ohio

[21] Appl. No.: 816,314

[22] Filed: Dec. 30, 1991

[51] Int. Cl.⁵ .................................. B60R 21/20
[52] U.S. Cl. ....................... 280/728 A; 280/728 B; 280/743 R
[58] Field of Search ............. 280/728, 730, 732, 743, 280/752, 733, 728 R, 728 A, 728 B

[56] References Cited

U.S. PATENT DOCUMENTS

| | | | |
|---|---|---|---|
| 3,176,364 | 4/1965 | Dritz | 24/213 |
| 3,211,322 | 10/1965 | Collons | 220/46 |
| 3,514,124 | 5/1970 | Richardson | 280/732 |
| 3,640,546 | 2/1972 | Brawn | 280/732 |
| 3,778,085 | 12/1973 | Lipkin . | |
| 3,887,214 | 6/1975 | Brawn | 280/730 |
| 3,904,222 | 9/1975 | Bursott et al. | 280/732 |
| 3,907,330 | 9/1975 | Kondo et al. | 280/731 |
| 3,945,665 | 3/1976 | Tsutsumi et al. | 280/731 |
| 3,968,979 | 7/1976 | Schiesteri . | |
| 3,982,774 | 9/1976 | Ivashuk et al. . | |
| 4,111,457 | 9/1978 | Kob et al. | 280/728 |
| 4,148,503 | 4/1979 | Shiratori et al. | 280/731 |
| 4,271,566 | 6/1981 | Perina | 24/204 |
| 4,325,568 | 4/1982 | Clark et al. | 280/731 |
| 4,327,937 | 5/1982 | Scholz et al. | 280/732 |
| 4,334,699 | 6/1982 | Patzelt et al. | 280/731 |
| 4,400,010 | 8/1983 | Stutz et al. | 280/732 |
| 4,414,902 | 11/1983 | Strasser et al. | 102/531 |
| 4,432,513 | 2/1984 | Yost | 244/99 |
| 4,437,269 | 3/1984 | Shaw | 51/358 |
| 4,696,705 | 9/1987 | Hamilton | 149/21 |
| 4,810,005 | 3/1989 | Fohl | 280/732 |
| 4,893,833 | 1/1990 | DiSalvo et al. | 280/732 |
| 4,938,503 | 7/1990 | Mursoka et al. | 280/731 |
| 4,943,075 | 7/1990 | Gates | 280/11.23 |
| 4,989,896 | 2/1991 | DiSalvo et al. | 280/732 |
| 5,060,972 | 10/1991 | Satoh et al. | 280/732 |
| 5,062,662 | 11/1991 | Cameron | 280/801 |
| 5,066,037 | 11/1991 | Castrigno | 280/743 |
| 5,116,079 | 5/1992 | Rhodes, Jr. | 280/732 |
| 5,161,819 | 11/1992 | Rhodes, Jr. | 280/728 B |

OTHER PUBLICATIONS

3M Automotive Dual Lock Fastening Systems, 4 page Product Brochure.

*Primary Examiner*—Karin L. Tyson
*Attorney, Agent, or Firm*—Calfee, Halter & Griswold

[57] ABSTRACT

An air bag assembly for a vehicle occupant compartment includes an inflatable air bag, a closure interposed between the air bag and the occupant compartment, and a fluid source for supplying fluid to the air bag to cause the air bag to inflate towards the occupant compartment. The air bag is positioned to apply a force to the closure upon receiving fluid from the source. The closure defines at least part of a separable connection which opens in response to the force so as to create an opening through which the air bag can be inflated into the occupant compartment. The separable connection is at least partially defined by a first connection surface, a second connection surface positioned adjacent to the first connection surface, and a connection device for connecting the first and second connection surfaces together. The separable connection is formed so as to open through movement of the first and second connection surfaces relative to each other in response to the force applied to the closure. The relative movement is primarily in a shear direction that is generally parallel to the first and second surfaces.

10 Claims, 12 Drawing Sheets

SEPARABLE CONNECTION FOR AN AIR BAG COVER ASSEMBLY

FIELD OF THE INVENTION

The present invention relates to a vehicle air bag assembly with a new and useful structure for a separable connection which opens to enable an air bag to be deployed and inflated at the onset of a crash or collision.

BACKGROUND AND SUMMARY OF THE INVENTION

A vehicle air bag assembly functions to protect a vehicle occupant during a crash or collision. At the onset of a collision, the air bag assembly deploys and inflates an air bag in front of a vehicle occupant who is being pitched forward by the force of the collision. The air bag absorbs the occupant's energy and retards forward movement of the occupant, to prevent the occupant from striking a rigid part of the vehicle. On the driver side of a vehicle, an air bag assembly is commonly incorporated into the vehicle steering wheel. On the passenger side of the vehicle, the air bag assembly is commonly incorporated into the vehicle instrument panel.

Typically, a vehicle air bag assembly includes a storage device for the air bag, and a fluid source which is actuated at the onset of collision for directing fluid into the air bag. The storage device includes a closure interposed between the air bag and the occupant compartment. When the fluid source directs fluid into the air bag, the air bag begins to inflate, and applies a force to the closure. The closure defines part of a separable connection which opens in response to that force to create a deployment opening through which the air bag can be deployed into the occupant compartment and fully inflated in front of a vehicle occupant.

Several different techniques are presently known for forming a separable connection which opens to create a deployment opening for an air bag. One known technique is to form the closure with weakened portions which break to create the deployment opening (see, e.g., U.S. Pat. No. 4,938,503). Another known technique is to form the closure with portions which are connected together by fused or welded seams which break to form the deployment opening (see e.g. U.S. Pat. Nos. 3,640,546 and 4,400,010). Still another known technique is to connect edge portions of the closure to other parts of the storage device by joints or tear strips which break to enable the closure to move relative to the other parts of the storage device to form the deployment opening (see e.g. U.S. Pat. No. 3,514,124). Yet another known technique is to press opposed portions of the closure against each other in such a way that the portions slide relative to each other to form the deployment opening (see e.g. U.S. Pat. No. 3,904,222).

Regardless of how the separable connection is formed, it should be designed to respond in a predictable manner to the force applied to the closure by an expanding air bag. Also, applicants believe the separable connection should be designed to enable the closure to be efficiently formed and incorporated into an air bag assembly, preferably by mass production techniques.

The present invention relates to a new and useful separable connection for an air bag assembly. The separable connection is designed to respond in a predictable manner to the pressure applied to the closure by an expanding air bag to form a deployment opening for the air bag. Moreover, the separable connection is designed to enable the closure to be efficiently formed and incorporated into an air bag assembly, preferably by mass production techniques.

The type of separable connection provided according to the invention is believed to be unusual for an air bag assembly. The separable connection includes connection surfaces which are connected to each other by a device which provides relatively high resistance to separation of the connection surfaces in a shear direction. At the same time, the separable connection is designed to enable the connection surfaces to separate primarily by movement relative to each other in the shear direction. ("Shear direction" in this context corresponds to a direction which is generally parallel to the connection surfaces.) Indeed, certain preferred structures for a separable connection according to the invention are particularly unusual because they use connection devices with a high resistance to separation in shear which has been specifically utilized in other contexts to create essentially permanent connections (see, e.g., Perina, U.S. Pat. No. 4,271,566). Nevertheless, applicants have incorporated such structures into separable connections designed to separate by movement primarily in a shear direction, but with the consistency and predictability required for an air bag assembly. Also, applicants have designed the separable connections to be particularly simple and efficient to incorporate into an air bag assembly by mass production techniques.

An air bag assembly according to the present invention comprises an inflatable air bag, a closure interposed between the air bag and an occupant compartment, and a fluid source for supplying fluid to the air bag to cause the air bag to inflate towards the occupant compartment. The air bag is positioned to apply a deployment force to the closure upon receiving fluid from the source. The closure defines at least part of a separable connection which opens in response to the deployment force so as to create a deployment opening through which the air bag can be deployed into the occupant compartment and inflated adjacent to a vehicle occupant. The separable connection is at least partially defined by a first connection surface, a second connection surface positioned adjacent to the first connection surface, and a connection device connecting the first and second connection surfaces together. The deployment opening is formed by movement of the first and second connection surfaces relative to each other in a shear direction that is generally parallel to the first and second connection surfaces.

In one form of an air bag assembly according to the present invention, the separable connection is formed between portions of the closure which separate from each other by movement in the shear direction in response to the deployment force.

In another form of an air bag assembly according to the invention, the separable connection is formed between an edge portion of the closure and a receptacle which forms a storage device for the air bag. When the air bag applies a deployment force to the closure, the edge portion of the closure separates from the receptacle to create the deployment opening for the air bag.

Two preferred types of devices for interconnecting the connection surfaces of a separable connection according to the present invention are: (i) "hook-and-loop" fasteners, such as fasteners sold under the trademark VELCRO™, and (ii) "dual-lock" fasteners which are marketed by The Automotive Specialties Division of Minnesota Mining & Manufacturing Co. under the name "Dual Lock Fastening Systems" (hereinafter referred to as "Dual Lock"). Both types of fasteners enable the connection surfaces to be connected to each other simply and efficiently, but provide a high resistance to separation of the connection surfaces in a shear direction.

According to the present invention, the hook-and-loop and/or "Dual-Lock" fasteners are incorporated into a separable connection in such a manner that the separable connection can open only by movement of the connection surfaces in a shear direction. Applicants believe such fasteners are particularly attractive for an air bag assembly because they allow the connection surfaces to be connected to each other simply and efficiently, and thus enable the closure to be efficiently formed and incorporated into an air bag assembly by mass production techniques. Additionally, such fasteners enable the separable connection to be completed prior to, during, or after, the installation of the air bag assembly into a vehicle. Still further, such fasteners can be conveniently separated by peeling the connection surfaces relative to each other, thereby enabling the separable connection to be selectively opened (e.g. for inspection, shipping, removal of loose parts, etc.) and then selectively closed to re-establish a complete air bag assembly.

Further features of the present invention will become apparent from the following detailed description and the annexed drawings.

DETAILED DESCRIPTION OF THE PREFERRED EMBODIMENTS

Figure 1:
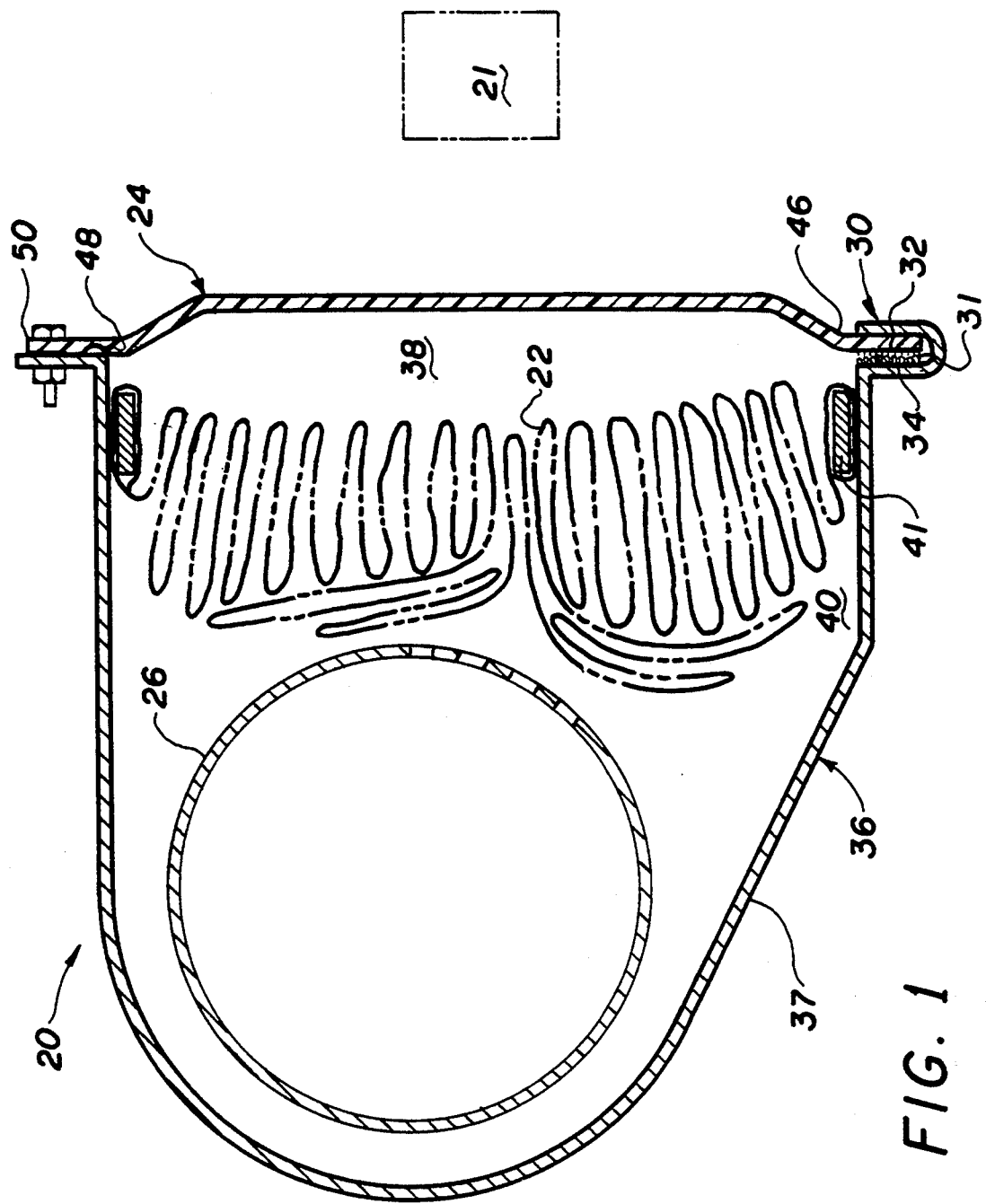
FIG. 1 is a schematic side sectional view of an air bag assembly according to the present invention, the air bag assembly including an inflatable air bag, a closure, and a fluid source, the air bag being shown positioned to apply a deployment force to the closure upon receiving fluid from the fluid source.
Figure 2:
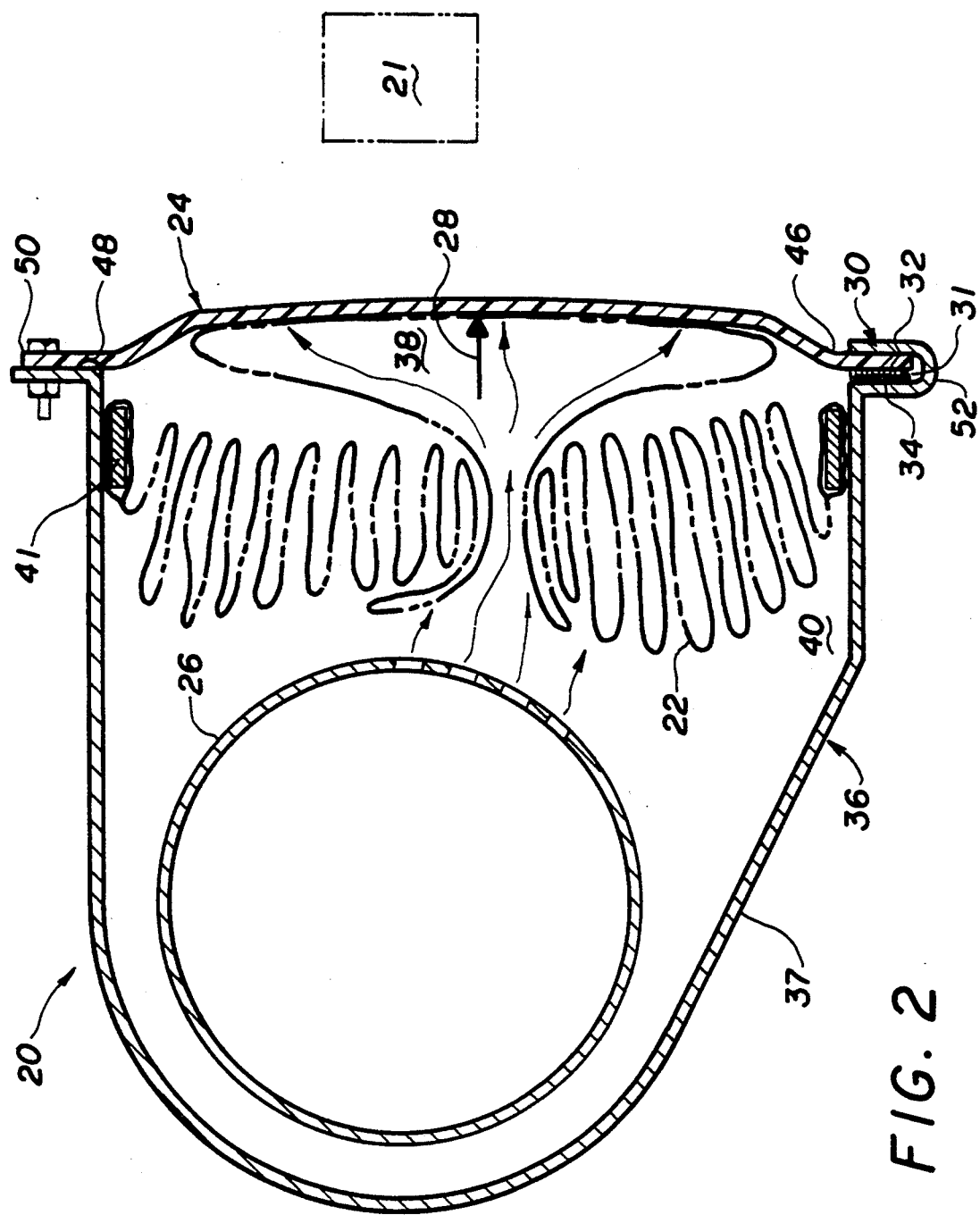
FIG. 2 is a schematic side sectional view of the air bag assembly of FIG. 1 showing the air bag applying a deployment force to the closure upon receiving fluid from the fluid source.
Figure 3:
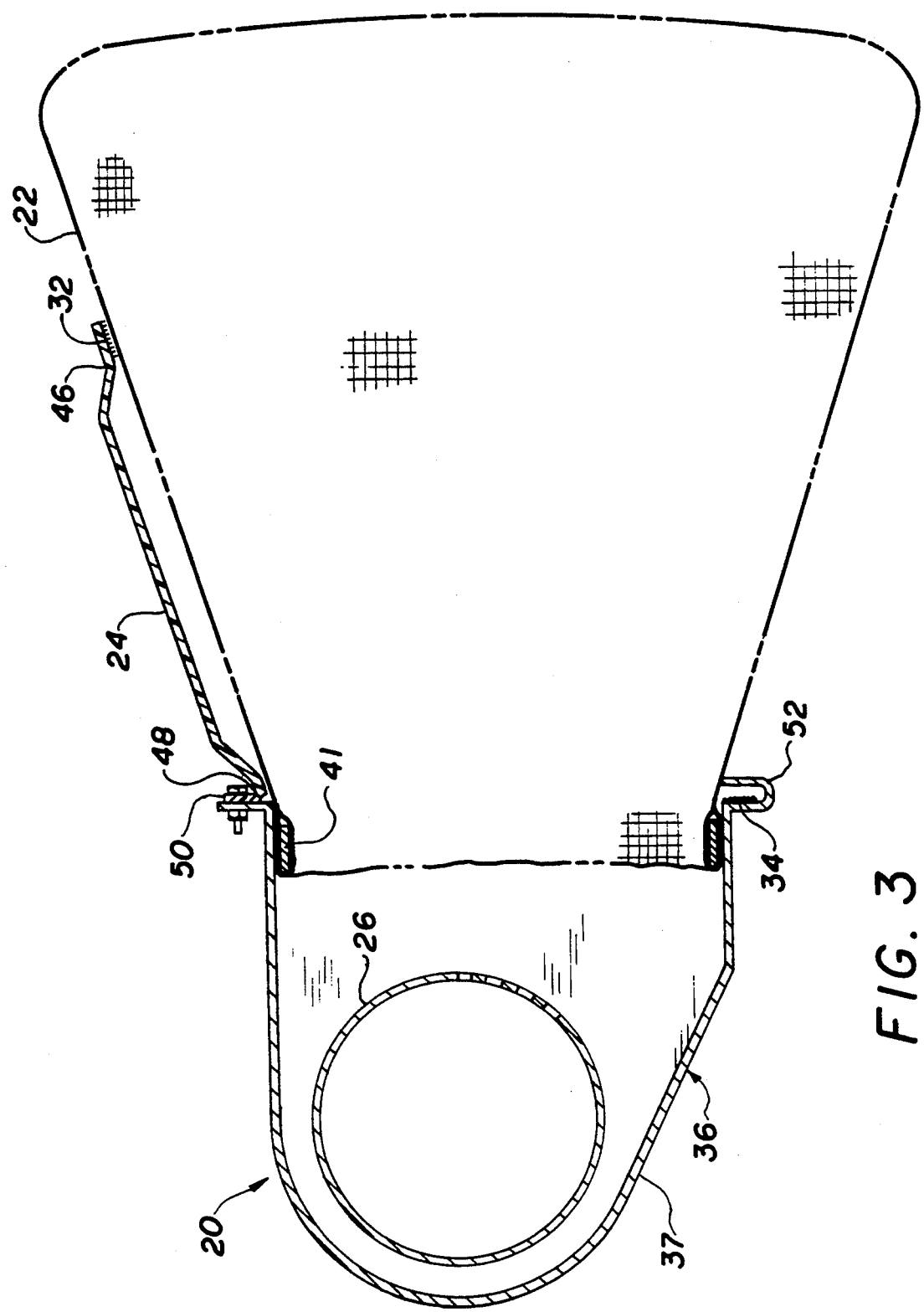
FIG. 3 is a schematic side sectional view of the air bag assembly of FIG. 1 showing the air bag in a fully inflated condition.

FIGS. 1-3 illustrate an air bag assembly 20 for a vehicle occupant compartment 21. The air bag assembly 20 includes an inflatable occupant restraint (commonly known as an "air bag") 22, a closure 24, and a fluid source, or inflator, 26. When the air bag assembly 20 is installed in a vehicle, the closure 24 is interposed between the air bag 22 and the vehicle occupant compartment (represented schematically at 21 in FIGS. 1 and 2). The fluid source 26 is adapted to supply fluid to the air bag 24 to cause it to inflate towards the occupant compartment 21. The air bag 22 is positioned to apply a deployment force to the closure 24 upon receiving fluid from the fluid source 26. The direction of the deployment force applied to the closure 24 is depicted schematically by arrow 28 in FIG. 2.

The closure 24 defines at least part of a separable connection 30 which opens in response to the deployment force 28. In this manner, a deployment opening is created through which the air bag 22 can be inflated into the occupant compartment 21 (see FIG. 3). The separable connection 30 is at least partially defined by a first connection surface 32, a second connection surface 34 positioned adjacent to the first connection surface 32, and a connection device 31 connecting the first and second surfaces 32 and 34. The separable connection 30 is formed so as to separate through movement of the first and second connection surfaces 32 and 34 relative to each other in response to the deployment force 28. This movement, which is shown schematically in FIGS. 4A-4D, is primarily in a shear direction which is generally parallel to the first and second connection surfaces 32 and 34.

The air bag assembly 20 further includes a receptacle 36 which is adapted to be coupled to a structural part of a vehicle. Thus, the receptacle 36 constitutes a reaction device which transmits forces between the air bag assembly 20 and the vehicle. While in the illustrated embodiments the reaction device comprises a reaction can 37, the present invention may also be incorporated into air bag assemblies having other types of reaction devices, such as reaction plates.

The reaction can 37 has a front opening 38 and an air bag cavity 40. Prior to deployment of the air bag assembly 20, the air bag 22, which is preferably made of fabric such as nylon, is located within the air bag cavity 40 and is coupled to the reaction can 37 in any suitable manner. For example, in the illustrated embodiment, a retaining ring 41 is attached to the mouth (or fluid inlet) of the air bag 22 and fasteners such as rivets (not shown) couple the retaining ring 41 to the reaction can 37. The fluid source 26 is also attached to the reaction can 37 (by conventional means, not shown), and is oriented so as to direct fluid toward the front opening 38 in the reaction can. Thus, the air bag 22 is positioned to receive fluid from the fluid source 26 and to apply the deployment force 28 to the closure 24.

The fluid source 26 can be of any number of known constructions, including the construction illustrated in U.S. Pat. No. 4,696,705, which is a preferred construction. In the illustrated embodiment, the fluid source 26 comprises a cylindrical housing 44 that encloses a chemical mixture (not shown). At the onset of a collision, the chemical mixture is ignited and generates large quantities of an inert, non-toxic gaseous fluid, such as nitrogen. The fluid is filtered and directed rapidly out of the housing 44 through radially located nozzles 46. Such fluid is directed into the air bag 22, which begins to inflate and applies the deployment force 28 to the closure 24.

The deployment force, which is shown schematically in FIG. 2 by the arrow 28, is actually applied across a central portion of the closure 24 by the air bag 22. The arrow 28 in FIG. 2 represents the result of such force. This resultant force is substantially centrally located on the closure 24 and is applied in a direction which is essentially perpendicular to the closure 24 and which is towards the occupant compartment 21.

Prior to deployment of the air bag 22, the closure 24 covers the front opening 38 of the reaction can 37, as is shown in FIG. 1. The closure 24 is preferably formed of a compression moldable, tough thermoplastic material such as polypropylene. The closure 24 includes a first edge portion 46 and a second edge portion 48 located at different areas about the perimeter of the closure 37. The first edge portion 46 is joined to the reaction can 37 by the separable connection 30. The second edge portion 48 is fixedly connected to the reaction can 37 by means of one or more fasteners (i.e. bolts) 50. A hinge 51 is formed in one piece with the closure, and is located adjacent the second edge portion 48. The hinge 51 enables the closure 24 to pivot relative to the reaction can 37 during deployment of the air bag 22 (see FIG. 3).

The first edge portion 46 is adapted to be separated from the reaction can 37 when the separable connection 30 opens through movement of the first and second connection surfaces 32 and 34 in the shear direction. The closure 24 pivots away from the reaction can 37 upon inflation of the air bag 22 into the occupant compartment 21, as is shown in FIG. 3. In other words, the first edge portion 46 extends only partially about the closure 24 and the remainder of the edge of the closure, or at least the second edge portion 48, remains coupled to the reaction can 37 after the separable connection 30 is opened.

The first connection surface 32 is located on a distal end of, and is actually a part of, the edge portion 46 and the second surface 34 is located on a portion of, and is actually a part of, the reaction can 37.

The reaction can 37 includes a confinement member which permits separation of the connection surfaces 32 and 34 only in the shear direction. In the illustrated embodiment, the confinement member comprises an elongated, relatively rigid U-shaped channel 52 having two substantially parallel legs 54 and 56 (FIGS. 4A–4D). The U-shaped channel 52 extends in a direction parallel to the plane of the front opening 38 of the reaction can 37. The second connection surface 34 is the inner surface of the leg 56 of the U-shaped channel 52. The legs 54 and 56 of the channel 52 are spaced apart a distance sufficient to permit the channel to receive the edge portion 46 of the closure 24 and the connection device 31. At the same time, the legs 54 and 56 are spaced closely enough substantially to prevent movement of the closure 24 relative to the channel 52 in a direction parallel to the force 28. In this manner, the connection surfaces 32 and 34 must separate in the shear direction as is shown schematically in FIGS. 4A–4D.

The connection device 31 includes a first set of upstanding members 60 projecting from the first connection surface 32 and a second set of upstanding members 62 projecting from the second connection surface 34. In the illustrated embodiment, the first set of upstanding members 60 are hook-shaped and the second set of upstanding members 62 are loop-shaped. However, this arrangement could be reversed and the first set of upstanding members could be loop-shaped and the second set of upstanding members could be hookshaped. In either event, the separable connection 30 would include "hook-and-loop" fasteners of the type sold under the trademark VELCRO™. The attachment of the connection device 31 to the connection surfaces 32, 34 may be accomplished by adhesively securing the relevant portions of the device to the closure 24 and the reaction can 37, respectively. Alternatively, the relevant portions may be joined to the closure 24 during the initial molding of this component.

To form a connection between the connection surfaces 32 and 34, the upstanding members 60 and 62 are engaged or mated with each other to form a series of hook-to-loop engagements. Due to the geometry of the U-shaped channel 52, the connection between the connection surfaces 32 and 34 must be made by sliding the connection surface 32 inwardly into the channel. Thus, the connection between the surfaces 32 and 34 is formed by movement of these surfaces relative to each other in the shear direction.

Figure 4A:
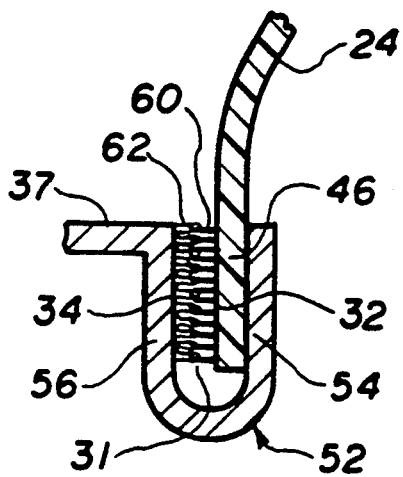
FIGS. 4A-4E are enlarged schematic views of certain parts of the air bag assembly of FIG. 1 in various stages of deployment, namely a separable connection which opens in response to the deployment force to create an opening.
Figure 4B:
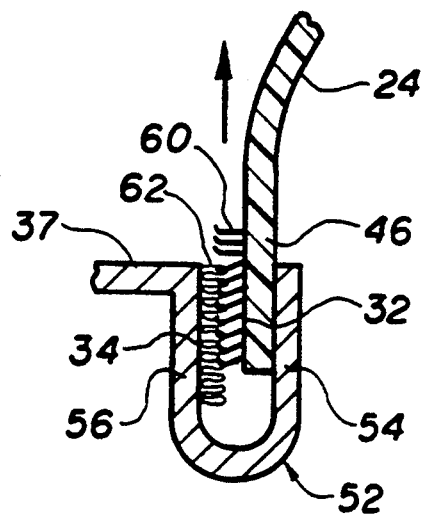
Figure 4E:
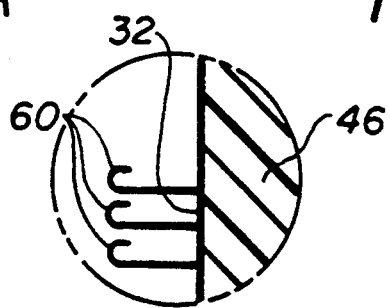
Figure 4C:
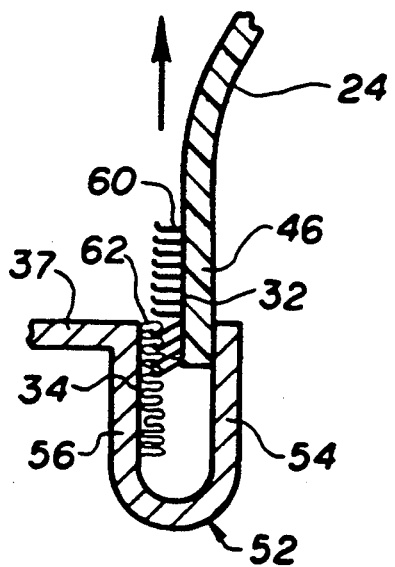
Figure 4D:
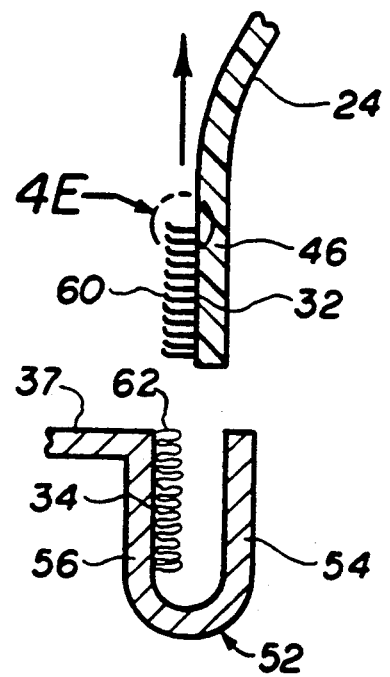

With "hook and loop" fasteners, there is normally a principal orientation of the hook-shaped members. As is best shown in FIG. 4E, the first set of upstanding members 60 are disposed with their principal orientation such that the hooks are curved outwardly toward the opening 38. This arrangement allows the upstanding members 60 and 62 to engage one another in a ratchet-like manner when the connection surfaces 32 and 34 are being slid relative to each other in the U-shaped channel 52. More specifically, the hook portions of the upstanding members 60 will incrementally slide over the loop portions of the upstanding members 62 as the connection surface 32 is slid into the U-shaped channel 52.

During deployment of the air bag 22, the connection surfaces 32 and 34 separate from each other by outward movement of the connection surface 32 relative to the channel 52. Such movement requires the connection surfaces 32, 34 to move relative to each other in the shear direction. Because of the principal orientation of the hook-shaped members, such outward movement of the connection surface 32 also requires that all of the hook-to-loop engagements must be initially simultaneously broken. Additionally, as subsequent hook-toloop engagements are made during movement of the connection surfaces 32 and 34 in the shear direction relative to each other, these subsequent engagements must then be simultaneously broken. For this reason, the connection between the surfaces 32 and 34 is particularly strong in the shear direction with this arrangement of the first set of upstanding members 60. In contrast, the easiest way to open a hook-and-loop fastener is by progressively peeling one connection surface from the other so that the hook-to-loop engagements are gradually broken.

Figure 13:
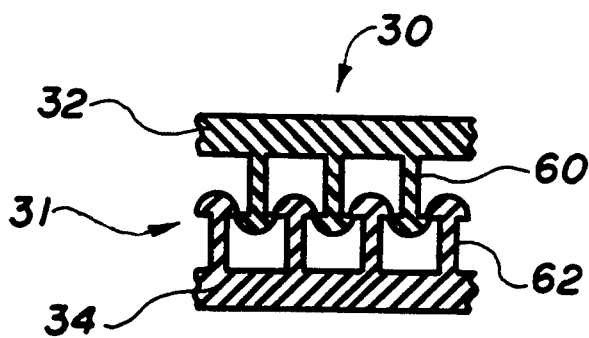
FIG. 13 is a schematic side sectional view of another embodiment of a separable connection which may be incorporated into an air bag assembly according to the present invention.

The connection device 31 could, alternatively, include "DualLock" fasteners. In such an alternative embodiment, both the first and the second set of upstanding members 60, 62 would be mushroomshaped, as is shown in FIG. 13. To connect the surfaces 32 and 34 in this embodiment, the first set of mushroom-shaped members are "snap-fit" between the "stems" of the second set of mushroom-shaped members. While the resistance to separation of this type of connection is strongest in a tensile direction perpendicular to the connection surfaces, it is nonetheless relatively strong in a shear direction.

When the separable connection 30 comprises hook-and-loop or "Dual Lock" type fasteners, the relative dimensions of the connection surfaces 32 and 34 will vary. The variation will depend principally on the overall dimensions of the air bag assembly and the amount of deployment force at which the separable connection is designed to open. A particularly attractive feature of hook-andloop and "Dual Lock" fasteners is that once such dimensions are determined, the fasteners will provide a consistent, predictable response when the deployment force is reached. Moreover, hook-and-loop and "Dual Lock" fasteners are commonly formed of tough, durable polymers (e.g., polyesters), the properties of which remain substantially constant over the required operating temperature range for an air bag assembly. Consequently, the response of such fasteners will not be materially affected by changes in the operating temperature range of the air bag assemblies in which they are incorporated.

Since hook-and-loop and "Dual Lock" fasteners are particularly simple and efficient to connect to each other, the final formation of the separable connection 30 may be completed prior to, during, or after, the installation of the air bag assembly 20 into a vehicle. Additionally, with certain versions of the invention, the separable connection 30 may be selectively connected or opened for inspection, shipping, or other requirements, as discussed hereinafter.

Figure 5:
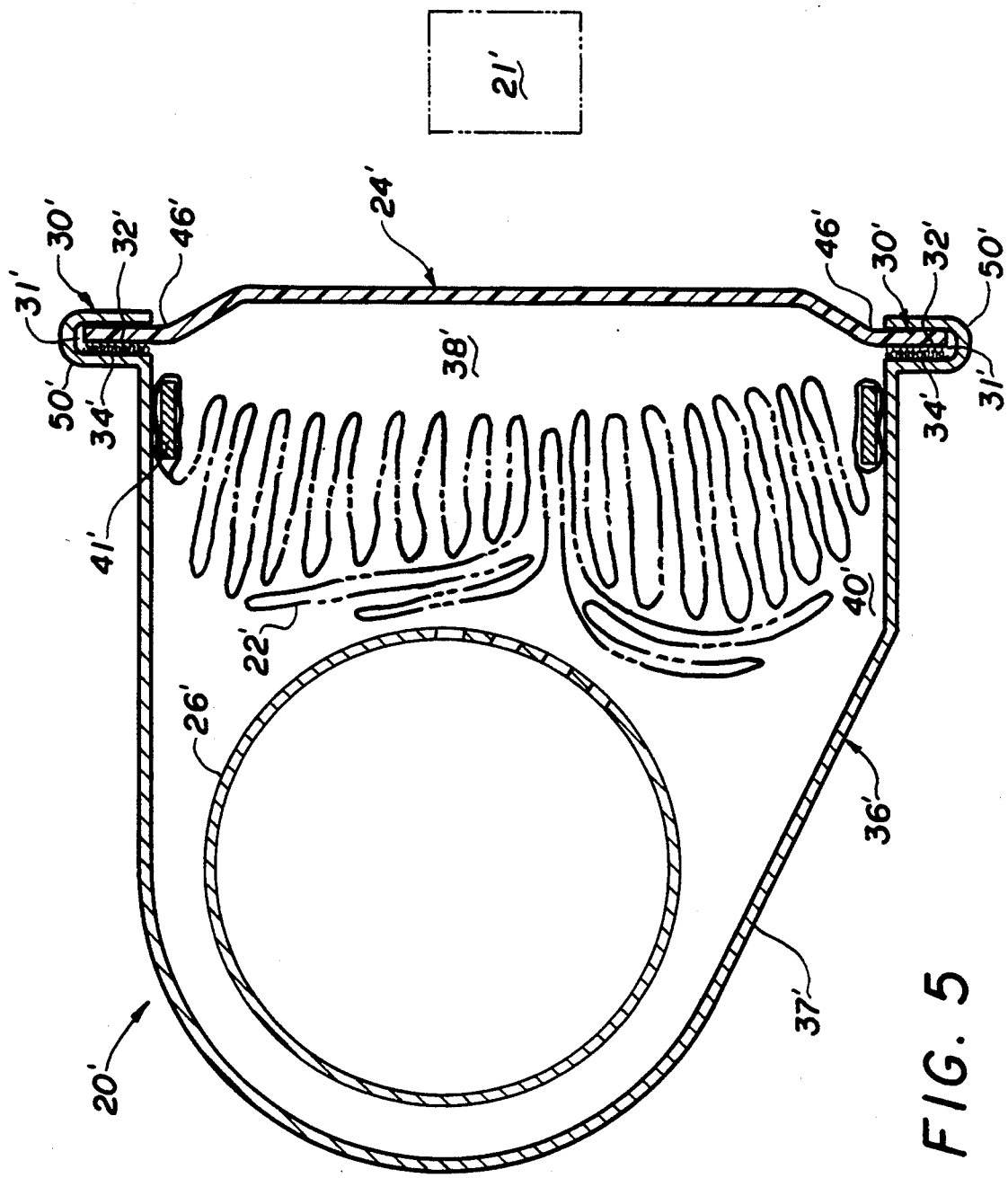
FIG. 5 is a schematic side sectional view of another air bag assembly according to the present invention, this air bag assembly including an inflatable air bag, a closure, and a fluid source, the air bag being shown positioned to apply a deployment force to the closure upon receiving fluid from the fluid source.
Figure 6:
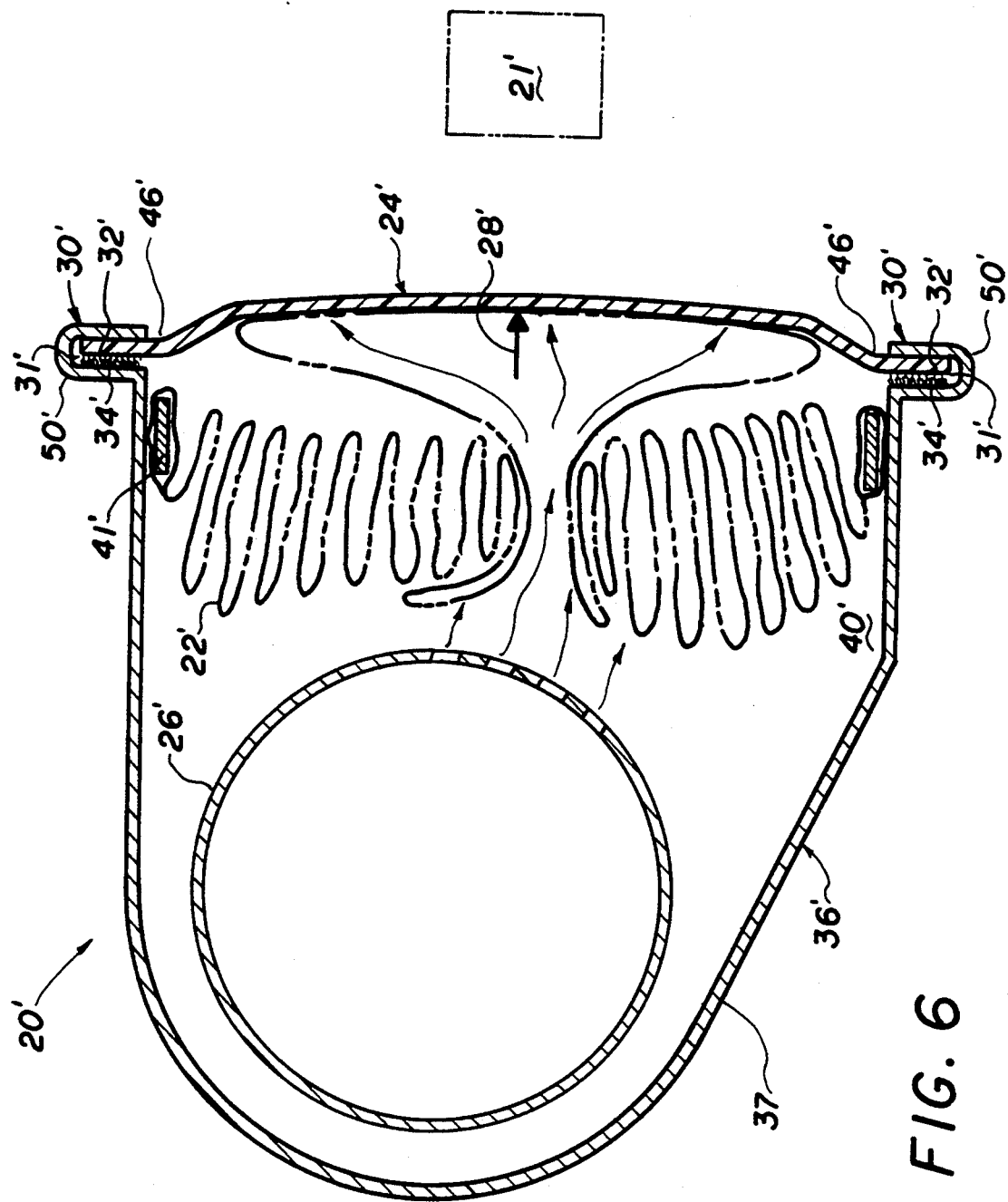
FIG. 6 is a schematic side sectional view of the air bag assembly of FIG. 5 showing the air bag applying a deployment force to the closure upon receiving fluid from the fluid source.
Figure 7:
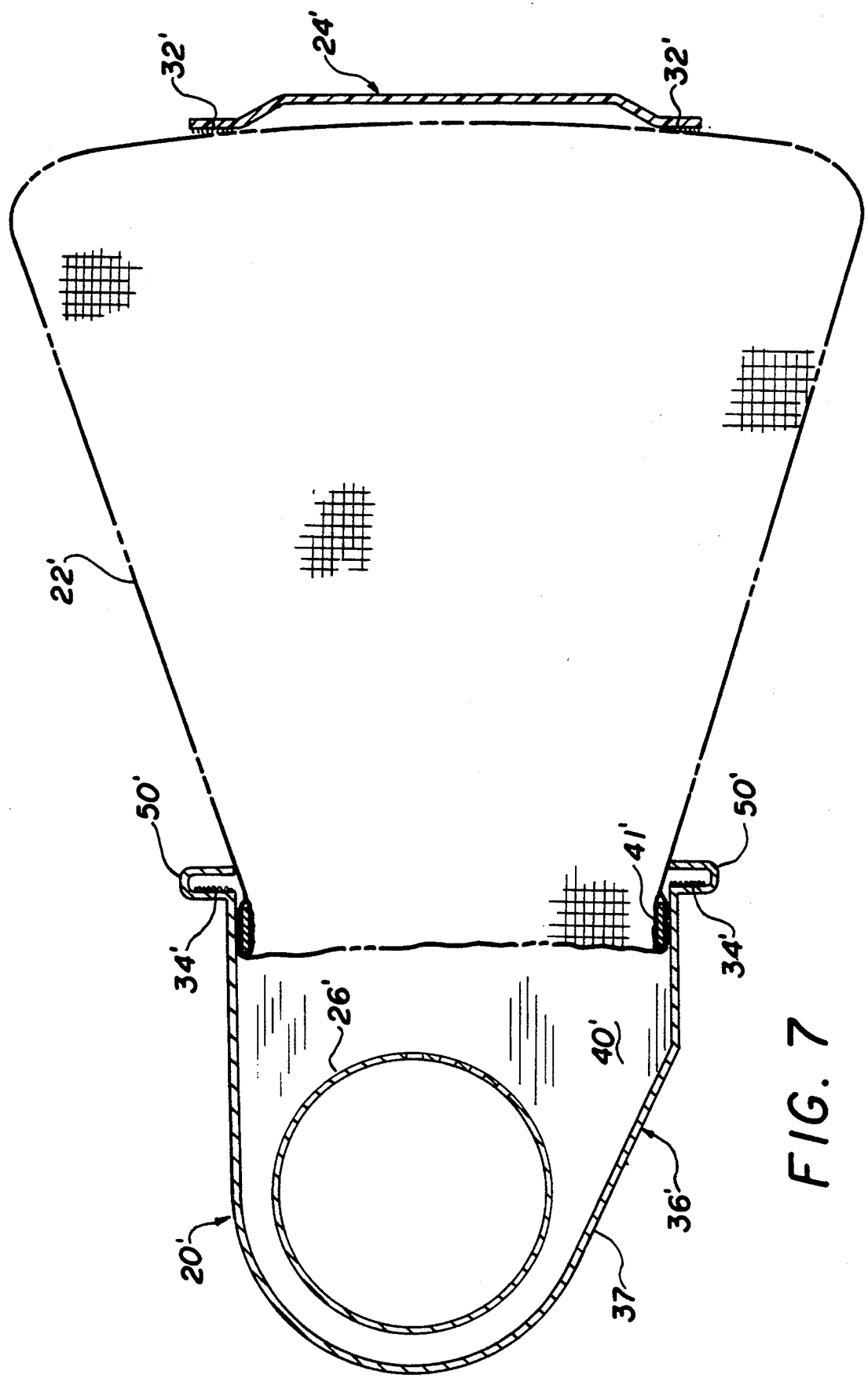
FIG. 7 is a schematic side sectional view of the air bag assembly of FIG. 5 showing the air bag in a fully inflated condition.
Figure 8:
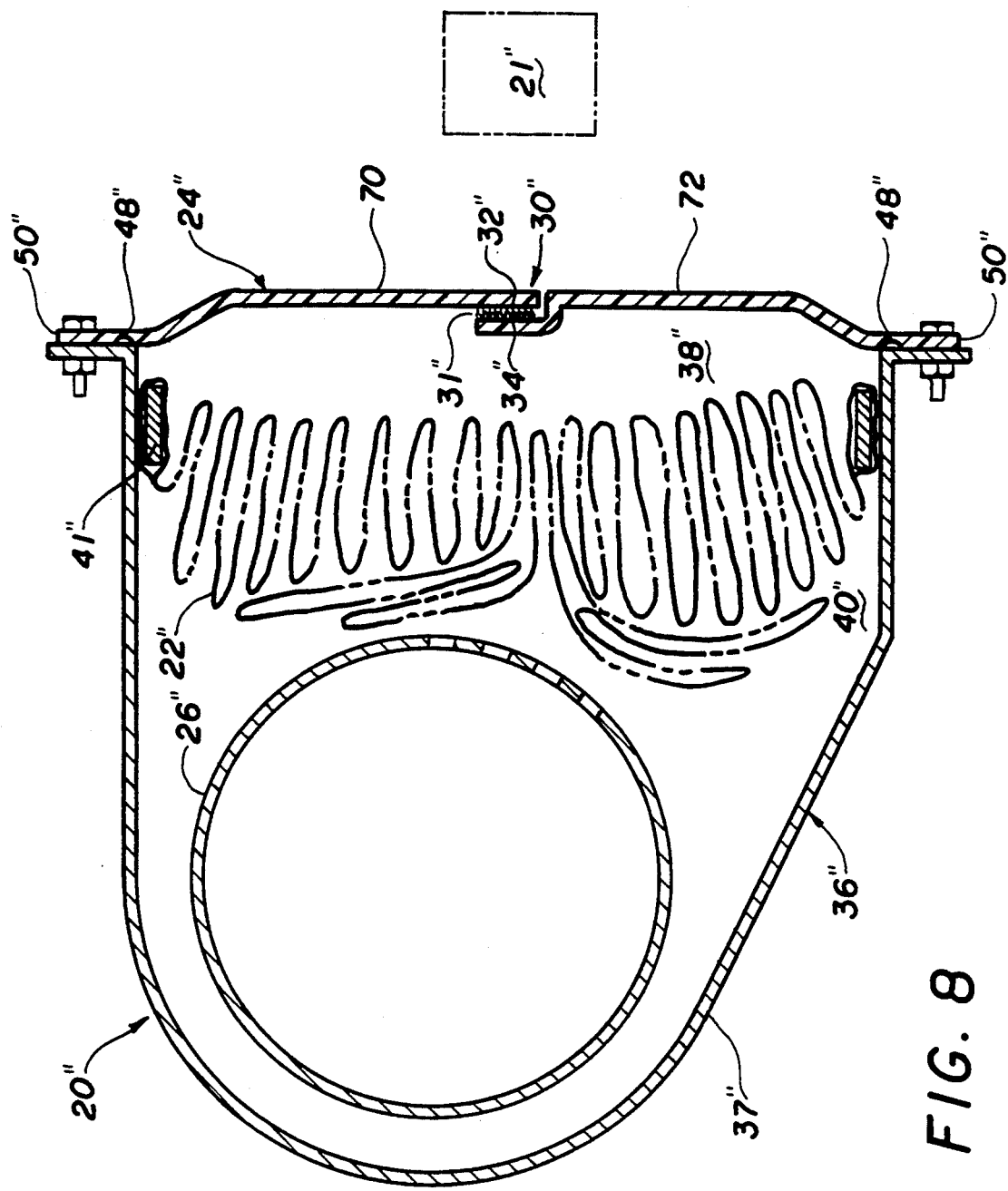
FIG. 8 is a schematic side sectional view of yet another air bag assembly according to the present invention, this air bag assembly including an inflatable air bag, a closure, and a fluid source, the air bag being shown positioned to apply a deployment force to the closure upon receiving fluid from the fluid source.

Another air bag assembly 20' according to the present invention is shown in FIGS. 5–7. The air bag assembly 20' includes many of the same components as the air bag assembly 20. Like reference numerals are used to designate like components, with the components of the air bag assembly 20' being followed by a single prime (') suffix. In the air bag assembly 20', the first edge portion 46' of the closure 24' extends around the entire periphery of the closure 24' and is connected to the receptacle 36' by means of the separable connection 30'. Additionally, the confinement member, or U-shaped channel extends around the entire periphery of the receptacle 36' and the closure 24' is directly coupled to the air bag 22', as by stitching.

When the air bag 22' applies the deployment force 28' to the closure 24', as is shown in FIG. 6, the connection surfaces 32' and 34' separate in the shear direction to open the separable connection 30'. This movement of the connection surfaces 32' and 34' is essentially the same as is shown schematically in FIGS. 4A–4D. When the separable connection 30' is opened, as is shown in FIG. 7, the entire closure 24' separates from the receptacle 36' but remains coupled to the air bag 22'.

Figure 9:
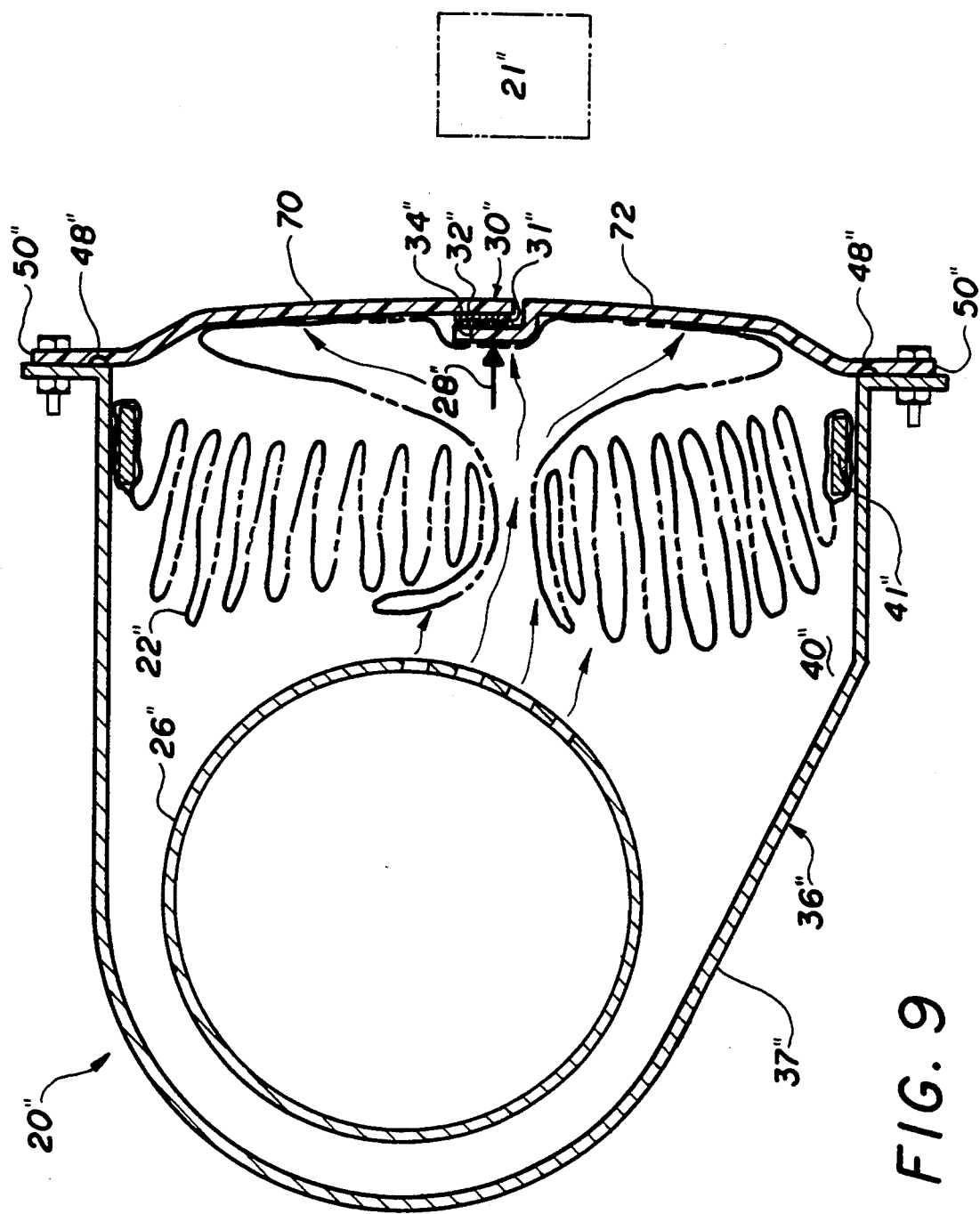
FIG. 9 is a schematic side sectional view of the air bag assembly of FIG. 8 showing the air bag applying a deployment force to the closure upon receiving fluid from the fluid source.
Figure 10:
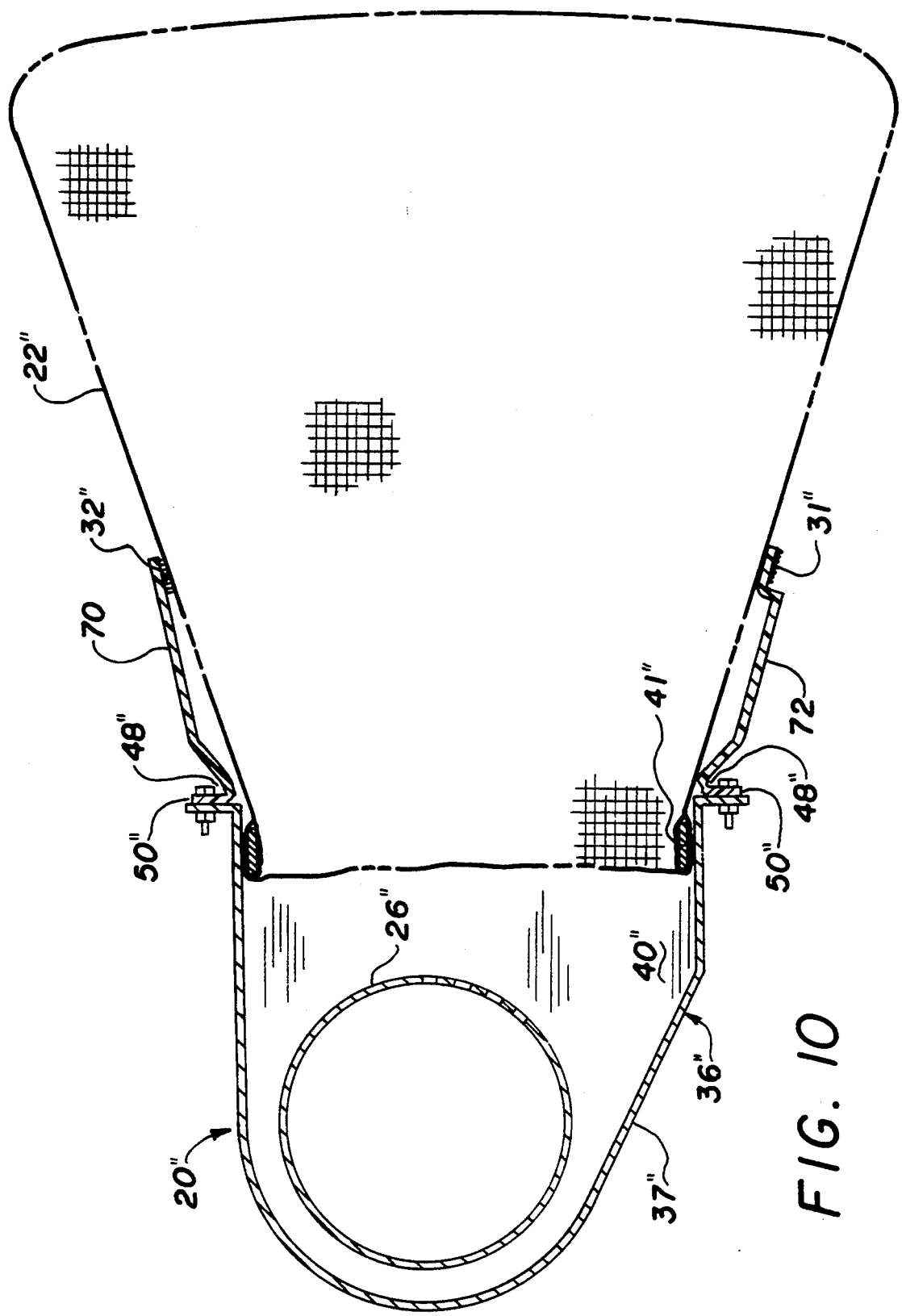
FIG. 10 is a schematic side sectional view of the air bag assembly of FIG. 9 showing the air bag in a fully inflated condition.
Figure 11A:
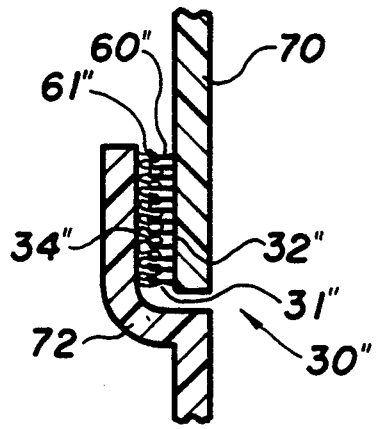
FIG. 11A-11D are enlarged schematic views of certain parts of the air bag assembly of FIG. 8 in various stages of deployment, namely a separable connection which opens in response to the deployment force to create an opening.
Figure 11B:
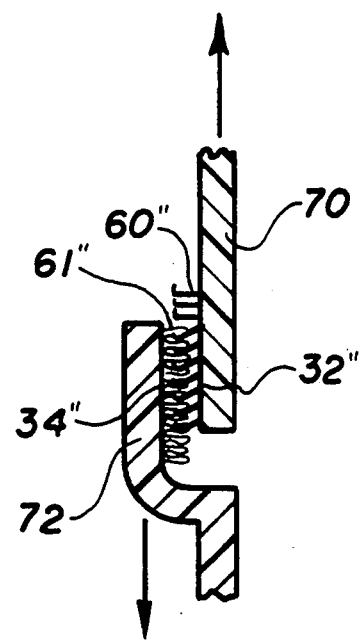
Figure 11C:
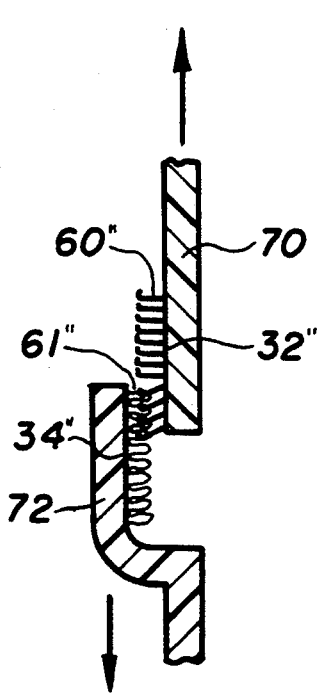
Figure 11D:
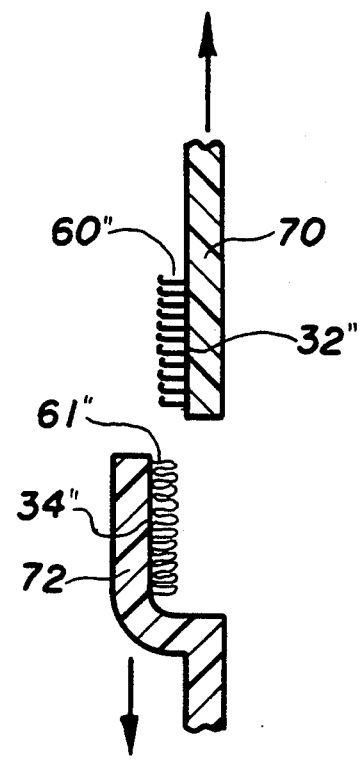

Another air bag assembly 20" according to the present invention is shown in FIGS. 8–11. This air bag assembly 20" also includes many of the same components as the air bag assembly 20. Like reference numeral are used to designate like components, with the components of the air bag assembly 20"being followed by a double prime (") suffix. In the air bag assembly 20", the closure 24" includes a first portion 70 and a second portion 72 which are essentially symmetrical in shape and which are joined together by the separable connection 30". The first portion 70 includes the first connection surface 32" and the second portion 72 includes the second connection surface 34". When the air bag 22" applies the deployment force to the closure 24", as is shown in FIG. 9, the connection surfaces 32" and 34" separate in the shear direction as is shown schematically in FIGS. 11A–11D. The first and second portions 70 and 72 of the closure 22" are coupled to the receptacle 36" by pivotal connections 51". In this manner, the first and second portions 70 and 72 remain coupled to the closure 22" after the separable connection 30" opens as is shown in FIG. 10.

In an air bag assembly of the type shown in FIGS. 8–11, the use of hook-and-loop or "Dual Lock" fasteners provides an additional useful feature, because the hook-and-loop or "Dual Lock"fasteners can be separated by peeling the connection surfaces relative to each other. Peeling the connection surfaces is a recognized way of conveniently separating the fasteners, and enables the separable connection to be selectively opened for any desired purpose (e.g. inspection, testing, removal of parts which have inadvertently come loose inside the air bag assembly). Moreover, with hook-and-loop or "Dual Lock"fasteners, the separable components can be reconnected by simply pressing the fasteners together, and will still provide a consistent, predictable response to a deployment force. Thus, the use of hook-and-loop or "Dual Lock"fasteners can make the connection surfaces repeatably connectable, as will be readily apparent to those of ordinary skill in the art.

Figure 12:
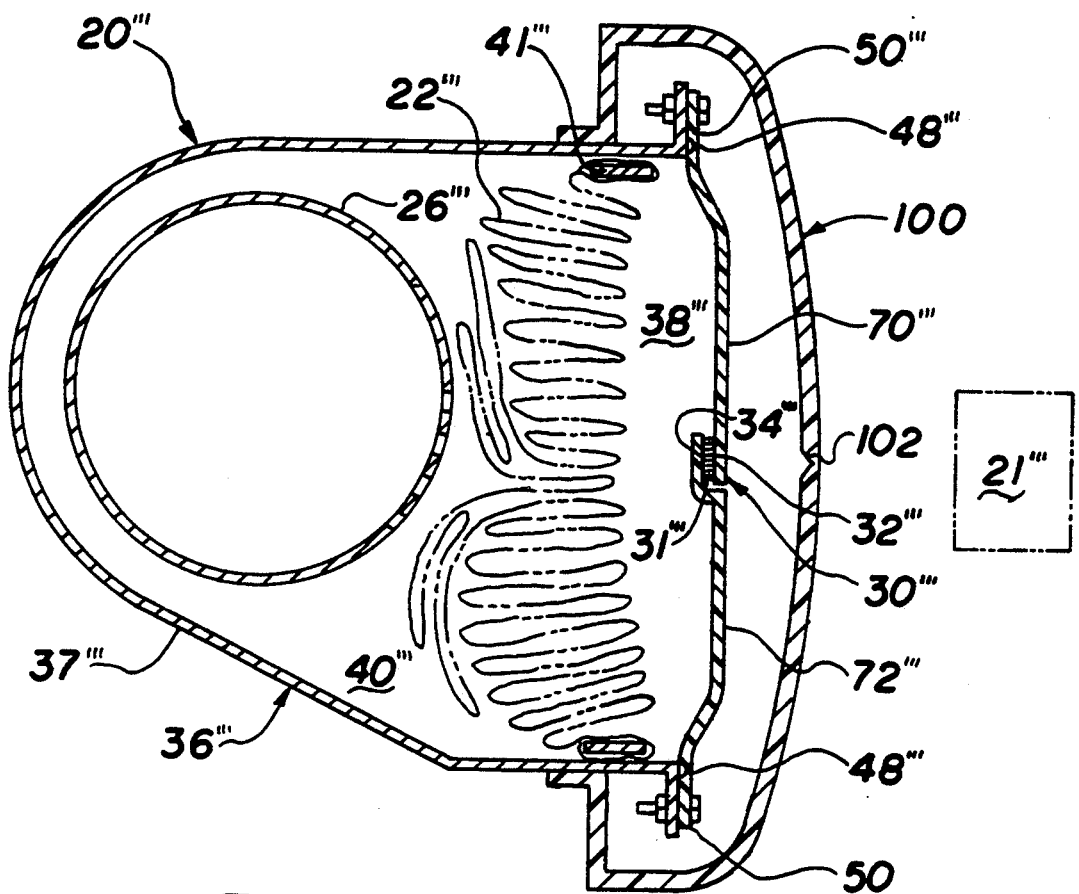
FIG. 12 is a schematic side sectional view of yet another air bag assembly according to the present invention which is similar to the air bag assembly of FIG. 8 except that it further includes an outer cover.

A further air bag assembly 20'"is shown in FIG. 12, and includes many of the same components as the air bag assembly 20". Consequently, like reference numeral are used to designate like components, with the components of the air bag assembly 20'"being followed by a triple prime ('") suffix. The air bag assembly 36'"further includes an outer cover 100 which is positioned between the closure 24'"and the occupant compartment 21'"and which includes a designed weakness 102. Once the separable connection 30'"has been opened, the air bag 22'"applies a force on the outer cover 100 which breaks the designed weakness and allows the air bag 22'"to inflate into the occupant compartment 21'".

Finally, while hook-and-loop or "Dual Lock"fasteners are preferred, it is believed that other connection devices, such as adhesives, may be used to connect the connection surfaces of an air bag assembly, in accordance with certain of the broadest aspects of this invention.

In summary, applicants have described above several new and useful preferred structures for forming a separable connection in an air bag assembly, in accordance with the present invention. For example, although the illustrated embodiments of the invention show an air bag inflator commonly used on the passenger side of the front seat of a vehicle, the invention can be used on the driver side of a vehicle and/or other seating positions and/or in the door of a vehicle (for side impacts). Further, although the illustrated embodiments of the invention show the closure 24 attached to a reaction can 27, the closure could be secured to another portion of the vehicle, such as the instrument panel. With the foregoing disclosure in mind, it is believed that obvious variations of the applicants' concepts, in accordance with the present invention, will become readily apparent to those of ordinary skill in the art.

What is claimed is:

1. An air bag assembly for a vehicle occupant compartment, said air bag assembly comprising:
   a receptacle having an air bag cavity,
       an inflatable air bag located in said air bag cavity and coupled to said receptacle,
       a closure coupled to said receptacle and interposed between said air bag and the occupant compartment, and
       a fluid source for supplying fluid to said air bag to cause said air bag to inflate towards the occupant compartment;
   said air bag being positioned to apply a force to said closure upon receiving fluid from said source;
   said closure defining at least part of a separable connection which opens in response to said force so as to create an opening through which said air bag can be inflated into the occupant compartment;
   said separable connection being at least partially defined by a first connection surface, a second connection surface overlapping said first connection surface, and a connection device positioned between and connecting said first and second connection surfaces together;
   said separable connection having a structure such that said separable connection opens through movement of said first and second connection surfaces relative to each other in response to said force, said movement being primarily in a shear direction that is generally parallel to said first and second surfaces and that is generally perpendicular to the direction of said force;
   said closure having an edge portion which is joined with said receptacle by said separable connection and which is adapted to separate from said receptacle when said separable connection opens through movement of said first and second connection surfaces primarily in said shear direction;
   said edge portion of said closure extending substantially entirely around said closure and being connected to said receptacle substantially entirely around said closure by said separable connection; and
   said closure being directly coupled to said air bag, so that the entire closure separates from said receptacle but said closure remains coupled to said air bag after said separable connection is opened.

2. An air bag assembly as set forth in claim 1 wherein said connection device comprises a first set of upstanding members projecting from said first connection surface and a second set of upstanding members projecting from said second connection surface.

3. An air bag assembly as set forth in claim 2 wherein one of said first and second set of upstanding members comprises hook-shaped members and wherein said other of said first and second set of upstanding members comprises loop-shaped members.

4. An air bag assembly as set forth in claim 2 wherein said first set of upstanding members are mushroom-shaped and wherein said second set of upstanding members are also mushroom-shaped.

5. An air bag assembly as set forth in claim 1 wherein said first and second connection surfaces are repeatably connectable connection surfaces.

6. An air bag assembly for a vehicle occupant compartment, said air bag assembly comprising:
   a receptacle having an air bag cavity,
       an inflatable air bag located in said air bag cavity and coupled to said receptacle,
       a closure coupled to said receptacle and interposed between said air bag and the occupant compartment,
       a fluid source for supplying fluid to said air bag to cause said air bag to inflate towards the occupant compartment;
   said air bag being positioned to apply a force to said closure upon receiving fluid from said source;
   said closure defining at least part of a separable connection which opens in response to said force so as to create an opening through which said air bag can be inflated into the occupant compartment;
   said separable connection being at least partially defined by a first connection surface, a second connection surface overlapping said first connection surface, and a connection device positioned between and connecting said first and second connection surfaces together;
   said separable connection having a structure such that said separable connection opens through movement of said first and second connection surfaces relative to each other in response to said force, said movement being primarily in a shear direction that is generally parallel to said first and second surfaces and that is generally perpendicular to the direction of said force;
   said closure having an edge portion which is joined with said receptacle by said separable connection and which is adapted to separate from said receptacle when said separable connection opens through movement of said first and second connection surfaces primarily in said user direction;
   said receptacle including a confinement member which permits separation of said first and second connection surfaces only in said shear direction;
   said confinement member including an elongated channel which closely encloses said first and second connection surfaces and the connection device and which extends in a direction that is generally perpendicular to the direction of said force; and
   said first and second connection surfaces being repeatably connectable connection surfaces.

7. An air bag assembly as set forth in claim 6 wherein said edge portion of said closure extends only partially about said closure and wherein the closure includes another edge portion which remains coupled to said receptacle after said separable connection is opened.

8. An air bag assembly as set forth in either of claim 6 or 7 wherein said connection device comprises a first set of upstanding members projecting from said first connection surface and a second set of upstanding members projecting from said second connection surface.

9. An air bag assembly as set forth in claim 8 wherein one of said first and second set of upstanding members comprises hook-shaped members and wherein sai other of said first and second set of upstanding members comprises loop-shaped members.

10. An air bag assembly as set forth in claim 8 wherein said first set of upstanding members are mushroom-shaped and wherein said second set of upstanding members are also mushroom-shaped.

* * * * *